TWO PIECE MULTI-APERTURE LOGIC ELEMENT

Filed July 13, 1964 2 Sheets-Sheet 1

INVENTORS.
ANTHONY M. APICELLA, JR.
JOHN T. FRANKS, JR.
BY
[signature]
ATTORNEY

TWO PIECE MULTI-APERTURE LOGIC ELEMENT

Filed July 13, 1964 2 Sheets-Sheet 2

| TIME | PULSE | LEG. 1 | LEG. 2 | LEG. 3 | LEG. 4 | |
|---|---|---|---|---|---|---|
| $t_1$ | B | ↓ | ↑ | ↓ | ↑ | TABLE I |
| $t_2$ | A | ↓ | ⇓ | ⇑ | ↑ | |
| $t_3$ | PRIME | ↓ | ⇑ | ⇓ | ↑ | |
| $t_1$ | B | ↓ | ↑ | ↓ | ↑ | TABLE II |
| $t_2$ | $\bar{A}$ | ↓ | ↑ | ↓ | ↑ | |
| $t_3$ | PRIME | ↓ | ↑ | ↓ | ↑ | |
| $t_1$ | $\bar{B}$ | ↑ | ↓ | ↓ | ↑ | TABLE III |
| $t_2$ | A | ↑ | ↓ | ↓ | ↑ | |
| $t_3$ | PRIME | ↑ | ↓ | ↓ | ↑ | |
| $t_1$ | $\bar{B}$ | ↑ | ↓ | ↓ | ↑ | TABLE IV |
| $t_2$ | $\bar{A}$ | ↑ | ⇑ | ↓ | ⇓ | |
| $t_3$ | PRIME | ↑ | ⇓ | ↓ | ⇑ | |

INVENTORS.
ANTHONY M. APICELLA, JR.
JOHN T. FRANKS, JR.
BY [signature]
ATTORNEY

United States Patent Office 3,354,444

Patented Nov. 21, 1967

3,354,444

TWO PIECE MULTI-APERTURE LOGIC ELEMENT

John T. Franks, Jr., Akron, and Anthony M. Apicella, Jr., Massillon, Ohio, assignors to Goodyear Aerospace Corporation, Akron, Ohio, a corporation of Delaware Filed July 13, 1964, Ser. No. 381,994
8 Claims. (Cl. 340—174)

This invention relates to a magnetic memory device capable of performing the "equality" or "exclusive or" logical operations with a non-destructive readout, and more particularly to a two piece multi-aperture ferrite magnetic logic element which can utilize printed circuitry and extremely simple construction.

This invention constitutes an improvement to the application for a "Multi-Aperture Logic Element," patent application No. 155,900, filed Nov. 30, 1961, now Patent Number 3,196,280, invented by John T. Franks, Jr., and assigned to Goodyear Aerospace Corporation.

Magnetic materials that possess the characteristic of retaining information either in positive or negative magnetic remnant states can be used to store signals. A winding coupled to such a magnetic material, when carrying a current of a given polarity, drives the magnetic material to its proper saturation level. When the driving current terminates the magnetic material settles back to its positive remnant state. The same winding or a second winding, when carrying current of an opposite polarity, drives the magnetic material to its negative saturation state. When the driving current terminates the magnetic material settles back to its negative remnant state.

Although multi-path magnetic cores have been developed to sense the storage condition in a magnetic material, these prior multi-path magnetic cores have not been developed to perform the "equality" and "exclusive or" logical operations all within the magnetic material and still retain the property of non-destructive readout. Memory circuits having diodes, transistors or relays and magnetic cores have been constructed to perform these logical operations. These circuits have the disadvantage of being bulky, of consuming large amounts of power and of having slow speeds.

The invention includes a two piece multi-aperture logic element, hereinafter identified as a two piece MALE, having separate flux paths defined by four separate legs of the two piece MALE. The flux paths associated with two of the legs are saturated by bias means. The direction of the flux pattern in the other flux paths is controlled by input means and indicates the storage of information. A readout or sense means links the flux paths associated with the two biased legs. Interrogate means magnetically coupled to an unbiased leg switches the direction of the flux in one of the two bias legs in accordance with the flux path established by the interrogate means to non-destructively interrogate the stored information.

It is the general object of the invention to avoid and overcome the foregoing and other difficulties and objections to prior art practices by the provision of a simple, and a compact magnetic core which is capable of performing the "equality" or "exclusive or" logical operations all within the core structure.

Another object of the invention is to provide a single magnetic core which will make a comparison of a variable input with a stored variable at a high repetition rate.

Another object of the invention is to provide a magnetic memory device which is capable of storing information, and of comparing the stored information with an input information without destroying the stored information.

A further object of the invention is to provide a magnetic memory device comprising two pieces where substantially all the wiring necessary to effect the logical operations can be positioned on printed circuitry around the magnetic memory device to facilitate construction, to insure accuracy, and to reduce the size requirements for the memory device.

For a better understanding of the exact nature of the invention, reference should be had to the accompanying drawings, wherein.

Figure 1:
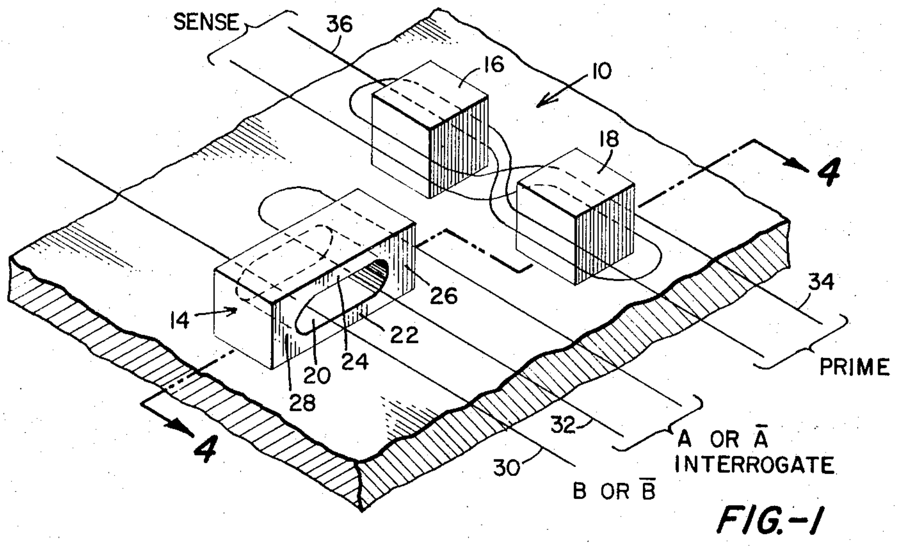
FIGURE 1 is a broken away perspective view of one piece of the two piece multi-aperture logic element showing the relationship between the legs, and the wiring thereof with an indication of the purpose of the wires.

With specific reference to the form of the invention illustrated in FIGURE 1 of the drawings, the numeral 10 illustrates generally a two piece MALE which is composed of a base plate 12 having an enlarged rectangularly shaped post 14 extending therefrom, which post 14 is generally integrally formed with the base plate 12. A pair of smaller similar substantially square shaped posts 16 and 18, respectively, are also generally integrally formed with the base plate 12 and are in adjacent, substantially aligned relationship with the enlarged post 14, as clearly indicated in FIGURE 1. The enlarged post 14 has a hole 20 therethrough which is substantially parallel to the base plate 12 and generally formed of an elongated nature to describe top and bottom portions 22 and 24, respectively, and end portions 26 and 28, respectively. The base plate 12 and posts 14, 16 and 18 are preferably constructed from a one piece square looped ferrite magnetic material.

In order to provide the element 10, of FIGURE 1, with flux patterns for the logical operations described hereinafter, a wire 30 is passed through the hole 20 in substantially adjacent relationship to the end portion 28, and directly out the other side. A wire 32 is also passed through the hole 20 substantially adjacent to the end portion 26, but extends out and around the end portion 26, as indicated, and back to its initial starting point. A prime wire 34 passes around post 18 and loops around post 16 before returning to its starting position. A sense wire 36 passes around post 16 and loops around post 18 before returning to its starting position.

Figure 2:
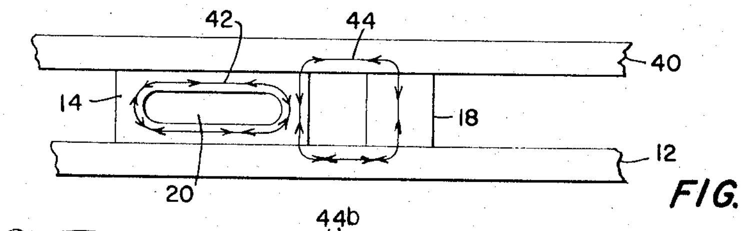
FIGURE 2 is a broken away elevational view of the element of FIGURE 1 with the top plate in place showing the relationship of the posts with the top and base plates and the flux patterns which may be established.
Figure 3:
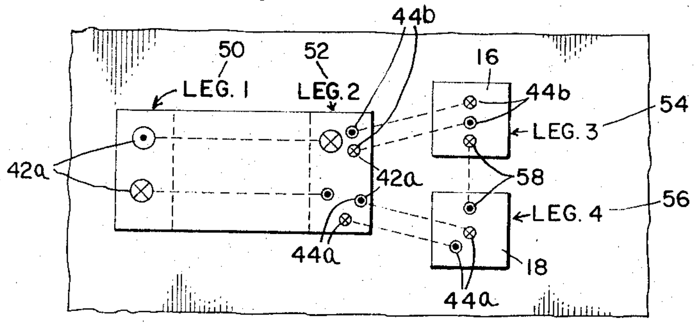
FIGURE 3 is a broken away plan view of the element of FIGURE 1 further showing the relationship between the posts, and showing the relationship of the possible flux patterns which may be established.

The flux patterns established by passing currents through the wires 30 and 32 and the prime wire 34 can best be understood with reference to FIGURES 2 and 3. First, however, with reference to FIGURE 2, a top plate 40, preferably of a high permeability ferrite magnetic material is positioned on the top surfaces of the elongated posts 14 and the smaller posts 16 and 18. It should be understood that this contact is intimately made so that magnetic flux patterns can be passed from the posts into the top plate 40. A current passed through line 30 is designed to induce a flux pattern in the elongated post 14 around the opening 20, in either direction as indicated by the opposite headed arrows 42. A current passed through the line 32 will induce a flux pattern between the elongated post 14 and one of the smaller posts 16 or 18 through the top plate 40 and the base plate 12, again in either direction as indicated by the opposite headed arrows 44. As an essential feature of the invention, the flux path indicated by arrows 42 around the opening 20 in the elongated post 14 must be of greater length than the flux path indicated by arrows 44 from one end of the elongated post 14 through the top plate 40, the square post 18 and the base plate 12. This is necessary so that when a current is passed through line 32 its flux pattern will be induced through the path indicated by arrows 44 because of the shorter length of this path thereby having less reluctance than the path indicated by arrows 42 around the opening 20. The necessity of the relationship between the length of the flux paths indicated by arrows 42 and 44 will be more clearly defined hereinafter.

With reference to FIGURE 3, the total possible flux paths will be explained. Particularly, FIGURE 3 has been labelled to call the end portion of elongated post 14 leg 1, indicated by numeral 50. The end of elongated post 14 adjacent the posts 16 and 18 is labelled leg 2, and indicated by numeral 52. Posts 16 and 18 are labelled legs 3 and 4, respectively, as indicated by numerals 54 and 56. Thus, it is seen that the flux path indicated by the opposite headed arrows 42 in FIGURE 2 passes either into or out of legs 1 and 2 as indicated by opposite symbols **42*a*. Although this flux path can be in either direction, it should be understood that the flux can be only in one direction at any specific instant of time. A flux path represented by opposite symbols 44*a* passes from leg 2 to leg 4. As stated above, the flux path indicated by the opposite symbols 44*a* is induced by current passed through line 32 and this flux path passes through the top plate 40 and through the base plate 12 to complete a loop from post 18 to leg 2 of elongated post 14. Likewise, a flux path indicated by the opposite symbols 44*b* will be induced by a top plate 40 and the base plate 12. It should be understood that at any one instant in time only one of the flux paths indicated by the opposite symbols 44*a* and 44*b* will be present, and that FIGURE 3 illustrates both flux paths merely for clarification to show that both can exist, but not at the same instant of time. Line 34, of FIGURE 1, is designed to carry a current to induce a flux pattern between legs 3 and 4 or between smaller posts 16 and 18 through the top plate 40 and the base plate 12, as indicated by a flux path indicated by the symbols 58 in FIGURE 3. This is called the prime pulse, to be explained in more detail later, and it is contemplated that this current pulse will be of one polarity only so that the flux path represented by the arrow 58 will always be in one known direction. Thus, the symbols 58 representing this flux path between legs 3 and 4** indicate that it is unidirectional.

Figure 4:
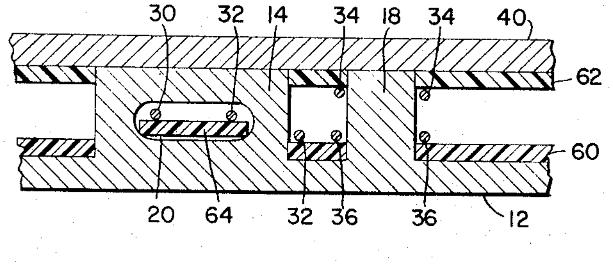
FIGURE 4 is a vertical cross sectional view of the element of FIGURE 1 with the top plate included, taken approximately on line 4—4 of FIGURE 1.

An extremely important feature of having the top plate 40 removably positioned in intimate contact with the top surfaces of the elongated post 14 and the smaller posts 16 and 18 is that construction of the logic element is greatly facilitated. Particularly, with reference to FIGURE 4, it is seen that a plastic film 60 may be positioned over the base plate 12 by suitable means, such as adhesive, which film 60 is a printed circuit adapted to carry the sense wires 36 and one half of the wire 32. Likewise, a plastic film 62 is adapted to be secured to the top plate 40 by suitable means, such as adhesive, which film 62 is also a printed circuit adapted to carry the prime wire 34. Likewise, a smaller plastic film 64 may be slidably positioned through the opening 20, which film 64 may be a printed circuit containing the wire 30 and the other half of the wire 32. Thus, it is seen that the construction of the logic element in two pieces allows all the wiring to be adapted to printed circuitry so that when the top plate 40 is brought into intimate contact with the tops of the posts 14, 16, and 18, with the plastic films 60, 62 and 64 properly positioned, the element is ready for usage except that the ends of the wire 32 on the separate films 60 and 64 must be connected. Thus, it is seen that the construction of the two piece MALE is greatly simplified by placing the wires on printed circuitry.

Figures 5, 6:
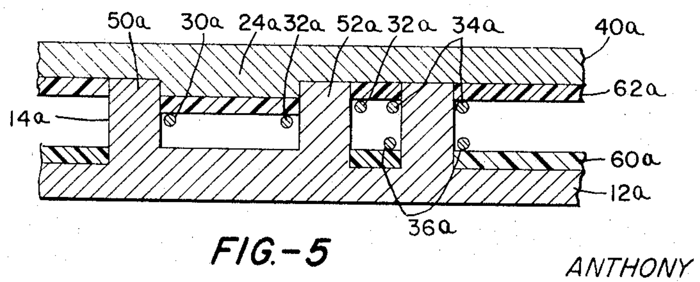
FIGURE 5 is a vertical cross-sectional view similar to FIGURE 4, but of another embodiment of the invention.
FIGURE 6 is table illustrating the flux directions in the four legs of the element as various flux patterns are applied during the logical operations.

FIGURE 5 illustrates another embodiment of the invention wherein a base plate **12*a* is essentially the same as the base plate 12 except that the top portion of an elongated post 14*a* has been removed and appears as a raised portion 24*a* on the bottom surface of a top plate 40*a*. The raised portion 24*a* is adapted to fit between first and second leg portions 50*a* and 52*a* of the post 14*a* Construction of the logic element in this manner allows a printed circuit 60*a* adhered to the top surface of the base plate 12*a* to contain the sense lines 36*a* while a printed circuit 62*a* adhered to the bottom surface of the top plate 40*a* contains a line 30*a*, 32*a*, and the prime line 34*a*. Thus, all the necessary wiring for the logical element can be placed on only two printed circuits 60*a* and 62*a*. The portion 24*a* of the top plate 40*a* fits into intimate contact with the legs 50*a* and 52*a* of the posts 14*a*** to achieve flux paths essentially the same as described with reference to the embodiment of the invention shown in FIGURE 3.

*Operation*

For an understanding of the operation of the two piece MALE of the invention, reference should be had to FIGURE 6. The diagram of FIGURE 6 illustrates the flux patterns in the respective leg portions of the two piece MALE during operation. Flux changes in the diagram are indicated by a double arrow. In Table I at time $t_1$ an input current pulse B through the input wire 30 produces a downwardly directed flux pattern in leg 1 and an upwardly directed flux pattern in leg 2. The direction of the flux in leg portions 1 and 2, established by the input current B applied to winding 30, is indicative of information stored in the two piece MALE. Legs 3 and 4 are set down and up respectively in the predetermined direction, as indicated previously, by a pulse through the prime winding 34. At time $t_2$ an interrogate current pulse A is supplied to the winding 32 to switch the flux patterns in the leg portions 2 and 3. The flux pattern in the leg portion 2 is switched downward and the flux pattern in the leg portion 3 is switched upward. The change in the flux pattern in leg 3 induces a voltage into the sense winding 36. At time $t_3$ the interrogate current pulse A is removed thus enabling the prime current to switch the leg pattern in legs 2 and 3 back to their initial status. That is the flux pattern in leg 2 is upward and the flux pattern in leg 3 is downward. Thus, an output signal is obtained when a stored B flux pattern is compared with an interrogate A flux pattern. Note that the flux pattern in leg 1 is not changed during the comparison thus providing the nondestructive readout capability of the logic element.

It is further contemplated that the interrogate pulse A may not be of sufficient magnitude to completely switch the flux patterns; in legs 2 and 3, but will merely start to partially switch the pattern. This partial switching will cause enough flux change to register an output pulse on the sense winding 36, but with the interrogate A pulse being of short duration to prevent complete flux reversal so that a very short prime pulse on line 34 or even the elastic qualities of the flux pattern prior to total reversal will readily return the element to its initial remanent state. Thus, the amount of current necessary to effect the comparison may be extremely small.

In Table II at time $t_1$ with an input B current pulse passed through the input winding 30, the flux pattern induced in leg 1 is downward and the flux pattern induced in leg 2 is upward. Again, a current pulse through the prime winding 34 establishes a downwardly directed flux pattern in leg 3 and an upwardly directed flux pattern in leg 4. At time $t_2$ an interrogate $\overline{A}$ current pulse through the winding 32 does not make any change in the flux pattern in legs 2, 3, or 4. Accordingly, there is no output signal. At time $t_3$ when the interrogate $\overline{A}$ current pulse is removed and the prime pulse is momentarily applied the flux pattern in the respective legs remains the same. The lack of flux change results because the leg portions are already saturated with flux in the same sense in which the magnetizing force of the current pulse through the winding 32 by the interrogate $\overline{A}$ pulse. Thus, this pulse simply tends to increase the flux flow in the saturated direction in these legs. In this condition there is substantially no flux change and substantially no output voltage is induced into the sense winding 36.

In Table III at time $t_1$ an input $\overline{B}$ current pulse passed through the winding 30 induces a flux pattern in leg 1 in an upward direction while the flux pattern induced in the leg 2 is downward. The prime current in the winding 34 produces a downward flux pattern in leg 3 and an upward flux pattern in leg 4, thus showing that legs 3 and 4 are initially the same as in Tables I and II regardless of the flux pattern stored in legs 1 and 2. At time $t_2$ with an interrogate A current pulsed through winding 32 the flux pattern in the legs 2, 3, and 4 does not change as the magnetizing force of the interrogate A pulse current only tends to increase the flux flow in the respective leg portions, as described in Table II above. At time $t_3$ the removal of the interrogate A pulse current does not effect the flux patterns in the respective leg portions. Thus, an output signal is not obtained when there is a stored $\overline{B}$ signal in the element and an interrogate A pulse is compared therewith.

In Table IV at time $t_1$, an input $\overline{B}$ current pulse is passed through winding 30 to induce an upward flux pattern in leg 1 and a downward flux pattern in leg 2. Again, the prime pulse is passed through winding 34 to induce a downward flux pattern in leg 3 and an upward flux pattern in leg 4. At time $t_2$, an interrogate $\overline{A}$ current is pulsed through winding 32 which tends to switch the flux pattern in leg portion 2 in the upward direction and the flux pattern in leg portion 4 in the downward direction. The change in the flux pattern in leg 4 induces a voltage into the sense winding 36. At time $t_3$ the interrogate $\overline{A}$ current pulse is removed and the prime pulse is applied through winding 34 to switch the flux pattern in legs 2 and 4 back to their initial status. Thus, an output signal is obtained when an interrogate $\overline{A}$ current pulse is compared with the stored $\overline{B}$ bit of information in the logic element. It should further be noted that there is no flux change in leg 1 during the comparison, thus providing the non-destructive readout characteristic of the element.

Thus, it is seen that once the input B or $\overline{B}$ current pulse establishes a flux pattern in legs 1 and 2 of the two piece MALE, the continuous interrogation of the two piece MALE with either the A or $\overline{A}$ current pulse does not destroy the initial B or $\overline{B}$ flux pattern. The interrogate A or $\overline{A}$ pulses operate to compare themselves with the stored information represented by the B or $\overline{B}$ flux pattern. It should further be understood that the operation of the device is sequential with the B or $\overline{B}$ information being first set into legs 1 and 2 of the element with legs 3 and 4 being set by the prime pulse, and then sequentially in time the interrogate A or $\overline{A}$ pulse is introduced to provide comparison between the stored B or $\overline{B}$ information.

It is apparent from the foregoing description that the improved two piece MALE disclosed is operative to perform the logic operation of comparing A to B or $\overline{A}$ to $\overline{B}$ all within the magnetic ferrite structure. Furthermore, the two piece MALE under actual operating conditions has an output signal to noise ratio of at least 100 to 1.

The device can also perform the logical operation of comparing A to $\overline{B}$ or $\overline{A}$ to B. This is accomplished by simply reversing or crossing the winding 32 so that an interrogate A signal pulse simply becomes an interrogate $\overline{A}$ signal pulse.

It should also be apparent that the device can be readily assembled utilizing printed circuitry for the necessary windings thus greatly facilitating construction of a digital memory utilizing a plurality of these elements. Again, it is pointed out that the element is non-destructive, that this feature is achieved because of the physical core construction whereby the flux path around legs 1 and 2 is longer than the flux path around legs 2 and 3, or legs 2 and 4, or legs 3 and 4. Thus, the flux introduced by the interrogate A or $\overline{A}$ signal pulse takes the shorter path providing the non-destructive characteristic.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a magnetic circuit capable of non-destructive comparison of a stored variable bit of information with an input variable bit of information the combination of

- a base plate having properties to carry magnetic flux patterns,
- an elongate post formed as an integral part of said base plate, said post having a hole therethrough which is substantially parallel to said base plate and centrally located in said post,
- a pair of smaller posts formed as integral parts of said base plate and located in substantially aligned adjacent relationship to each other and to one end of said elongated post,
- a top plate having properties to carry magnetic flux patterns intimately affixed to the top surfaces of said posts,
- winding means through the hole in the elongated posts adapted to carry an electric current to set a stable flux pattern around said hole in said post,
- winding means through said hole in the elongated post and surrounding said one end thereof adapted to carry an electrical current to set a stable flux pattern around said one end of said elongated post through said top plate, through one of said smaller posts, and through said base plate,
- bias winding means surrounding the smaller posts adapted to carry current to set a stable flux pattern through one said smaller post, the top plate, the other smaller post, and the base plate, and
- sense winding means surrounding the smaller posts adapted to sense flux changes therein.

2. A magnetic circuit comprising

- a magnetic core having a pair of spaced body portions separated by first, second, third and fourth leg portions, the distance between the first and second leg portions being greater than the distance between the second and third leg portions and the second and fourth leg portions and the third and fourth leg portions,
- bias means for saturating the third and fourth leg portions in pre-determined directions,
- means for setting a stored variable bit of information as a flux pattern around said first and second leg portions,
- means linked with the second leg portion for selectively reversing the direction of the flux in the third and fourth leg portions, and
- means for sensing a flux change in either the third or fourth leg portions.

3. In a magnetic circuit capable of non-destructive comparison of a stored variable bit of information with an input variable bit of information the combination of

- a base plate having properties to carry magnetic flux patterns,
- four post means formed in spaced relationship as integral parts of said base plate, the distance between the first and second post means being greater than the distance between the second and third post means, and the distance between the second and third post means being substantially equal to the distance between the second and fourth post means, and the distance between the second and fourth post means being substantially equal to the distance between the third and fourth post means, a top plate having properties to carry magnetic flux patterns intimately affixed to the top surfaces of said post means, printed circuit means operatively mounted between said top plate and said base plate, winding means operatively carried by said printed circuit means surrounding said first post means adapted to carry current to set a stable flux pattern around said first and second post means, winding means operatively carried by said printed circuit means surrounding said third and fourth post means adapted to carry a current to set a stable flux pattern therearound, winding means operatively carried by said printed circuit means surrounding said second post means adapted to carry a current to change the flux pattern around said third and fourth post means if the flux pattern compares to said flux pattern around said first and second post means, and output winding means operatively carried by said printed circuit means surrounding said third and fourth post means to detect flux changes therein.

4. In a magnetic circuit capable of non-destructive comparison of a stored variable bit of information with an input variable bit of information the combination of a base plate having properties to carry magnetic flux patterns, four post means formed in spaced relationship as integral parts of said base plate, the spaced relationship between the first and second post means being larger than the spaced relationship between the second and third post means, the second and fourth post means, and the third and fourth post means, a top plate having properties to carry magnetic flux patterns intimately affixed to the top surfaces of said posts, printed circuit means operatively positioned between said base plate and said top plate, wire means carried by said printed circuit means adapted to carry current to induce a flux pattern around said first and second post means to represent a variable stored bit of information, wire means carried by said printed circuit means adapted to carry current to induce a pre-determined flux pattern around said third and fourth post means, wire means carried by said printed circuit means adapted to carry current to induce a flux pattern into said second post means to represent an input variable bit of information to selectively reverse the direction of the flux in the third and fourth post means if said input variable bit of information compares with said stored variable bit of information, and wire means carried by said circuit means for sensing a flux change in either of the third or fourth leg portions.

5. In a magnetic circuit the combination of a base plate having properties to carry magnetic flux patterns, an elongated post operatively and intimately affixed to said base plate, said post having a hole therethrough which is substantially parallel to said base plate and centrally located in said post, a pair of smaller posts formed operatively and intimately affixed to said base plate and located in substantially aligned adjacent relationship to each other and to one end of said elongated post, a top plate having properties to carry magnetic flux patterns intimately affixed to the tops of said posts so as to be substantially parallel to said base plate, means to set a stable flux pattern around said hole in said elongated post, means to set a stable flux pattern around said one end of said elongated post through said top plate, through one of said smaller posts, and through said base plate without destroying the flux pattern around said hole in said elongated post, means to set a stable flux pattern through one said smaller post, the top plate, the other smaller post, and the base plate, and means to sense flux changes in said smaller posts.

6. A magnetic circuit comprising a magnetic core having a pair of body portions in intimate contact with and separated by first, second, third and fourth leg portions, the distance between the first and second leg portions being greater than the distance between the second and third leg portions and the second and fourth leg portions and the third and fourth leg portions, printed circuit means between said separated body portions and surrounding said leg portions, wire means operatively carried by said printed circuit means for saturating the third and fourth leg portions in predetermined directions, wire means operatively carried by said printed circuit means for setting a stored variable bit of information as a flux pattern around said first and second leg portions, wire means operatively carried by said printed circuit means surrounding the second leg portion for selectively reversing the direction of the flux in the third and fourth leg portions without destroying the flux pattern in the first and second leg portions, and means for sensing a flux change in either the third or fourth leg portions.

7. A magnetic circuit comprising a magnetic core having a pair of body portions in intimate contact with and separated by first, second, third, and fourth leg portions, the distance between the first and second leg portions being greater than the distance between the second and third leg portions, and the second and fourth leg portions and the third and fourth leg portions, printed circuit means between said separated body portions and surrounding said leg portions, first wire means operatively carried by said printed circuit means adapted to carry current to saturate the third and fourth leg portions with a flux pattern in a predetermined direction, second wire means operatively carried by said printed circuit means to carry current to saturate the first and second leg portions with a flux pattern representing a stored variable bit of information, third wire means operatively carried by said printed circuit means to carry current to saturate the second leg portion with a flux pattern representing an input variable bit of information whereby the direction of the flux pattern of the third and fourth leg portions is selectively reversed when the input variable bit of information compares with the stored variable bit of information, and wire means operatively carried by said printed circuit means to sense when flux changes occur in either of the third or fourth leg portions.

8. In a two-piece magnetic circuit the combination of a base plate having properties to carry magnetic flux patterns, four post means having properties to carry magnetic flux patterns formed in spaced relationship as integral parts of said base plate, the spaced relationship between the first and second post means being larger than the spaced relationship between the second and third post means, the second and fourth post means, and the third and fourth post means, a top plate having properties to carry magnetic flux patterns intimately affixed to the top surfaces of said post, printed circuit means operatively positioned between said base plate and said top plate, first wire means carried by said printed circuit means adapted to carry current to saturate the third and fourth leg portions with a flux pattern in a predetermined direction, second wire means carried by said printed circuit means to carry current to saturate the first and second leg portions with a flux pattern representing a stored variable bit of information, the third wire means carried by said printed circuit means to carry current to saturate the second leg portion with a flux pattern representing an input variable bit of information whereby the direction of the flux pattern in the third and fourth leg portions is selectively reversed when the input variable bit of information compares with the stored variable bit of information, and fourth wire means carried by said printed circuit means to sense when flux changes occur in either the third or fourth leg portions.

No references cited.

BERNARD KONICK, *Primary Examiner.*

S. URYNOWICZ, *Assistant Examiner.*